Patented July 23, 1940

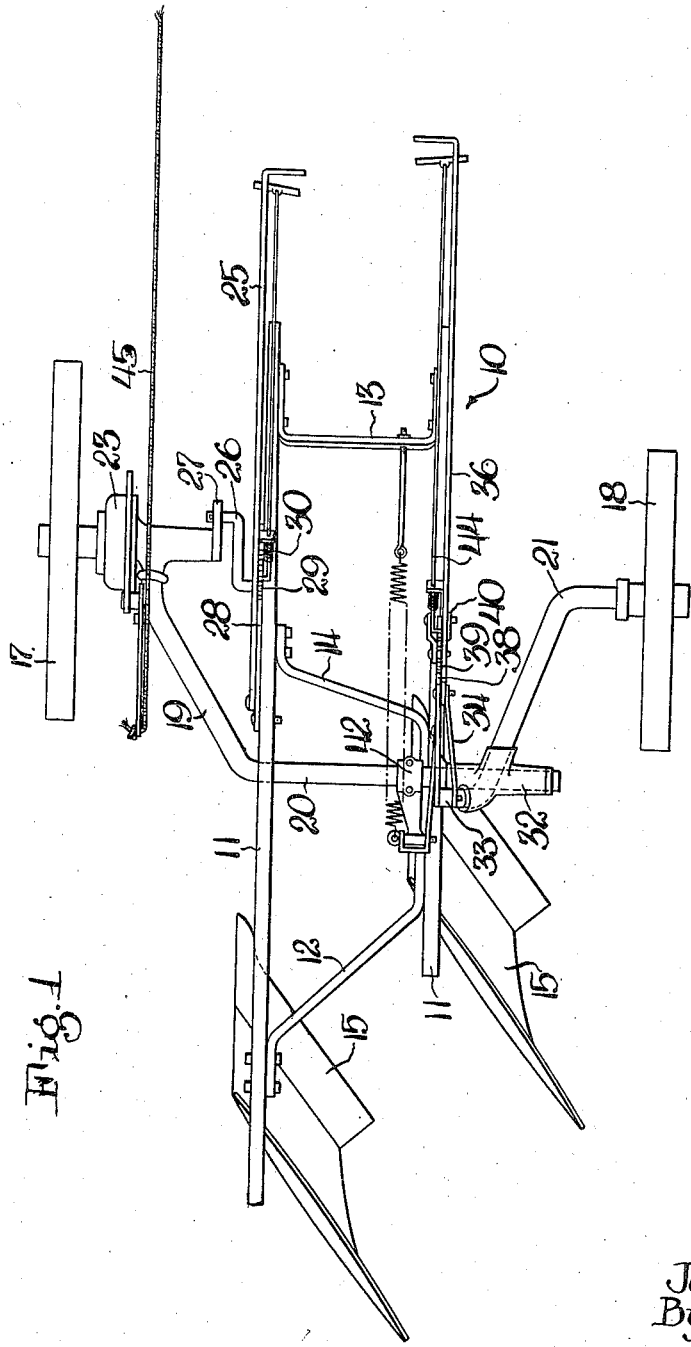

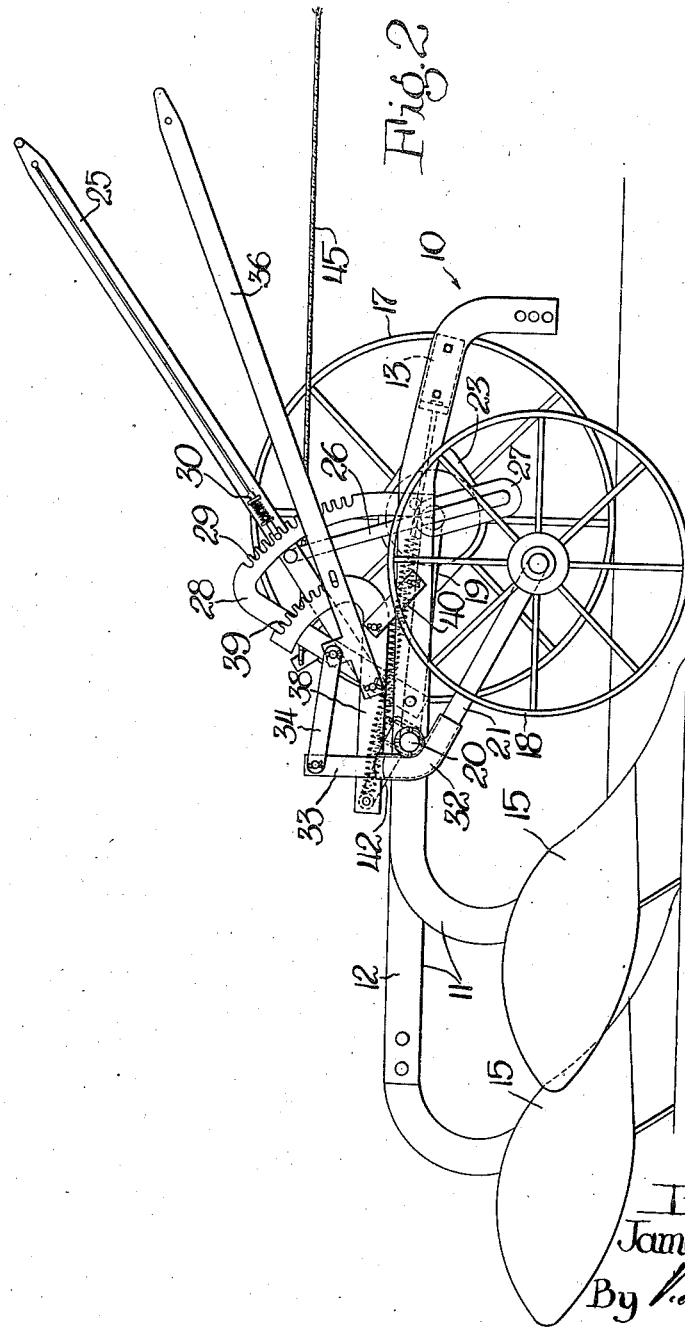

2,209,031

UNITED STATES PATENT OFFICE 2,209,031

PLOW

James Morkoski, Canton, Ill., assignor to International Harvester Company, a corporation of New Jersey Application July 8, 1938, Serial No. 218,163

2 Claims. (Cl. 97—73)

This invention relates to an adjustment for a plow. More specifically it relates to an adjusting arrangement of both the land wheel and the furrow wheel of a plow.

It has long been desirable in plow construction to have separate adjustments of the land wheel and the furrow wheel of a plow as well as joint adjustment of both wheels. Joint adjustment of the two wheels has been rendered difficult because the crank axles are normally arranged to turn about unalined axes of rotation. It is, therefore, proposed to position the crank axles of the two wheels so as to rotate about alined axes for the sake of joint adjustment of the two wheels.

A primary object of the invention is, therefore, to provide a plow construction which permits the separate adjustment of the furrow wheel as well as the joint adjustment of both wheels.

Another object is the provision of a ground-working implement carried on a pair of wheels in which there is provision for separate depth adjustment of the one wheel and joint depth adjustment of both wheels.

Still another object is to provide a plow of which the land wheel and the furrow wheel are mounted on crank axles arranged to turn about alined axes.

A further object is the provision of a ground-working implement carried on a pair of wheels of such construction that the crank axles of the wheels are positioned to swing about alined axes for the sake of separate and joint depth adjustment of the wheels.

In the drawings,

Figure 1 shows a plan view of the plow; and,

Figure 2 shows a side elevation of the plow.

The plow 10 has a plow frame formed of a pair of plow beams 11 connected by means of a rear brace 12, a forward U-shaped brace 13, and an intermediate brace 14. Each plow beam carries a plow share 15. The plow is supported by a land wheel 17 and a furrow wheel 18 through a crank axle 19 having an extended portion 20 reaching across the plow beams 11 and an axle 21. On the crank axle 19 is a power lift device 23 of the half-revolution type, such as shown in the patent to Lindgren, 1,561,611, of November 17, 1925. Depth adjustment of the land wheel 17 is effected through a lever 25, pivotally mounted on a member 28 fixed to one of the plow beams 11 and connected through a link member 26 connected to a crank portion 27 inwardly of the power lift 23. The member 28 has an arcuate portion 29 which is engaged by a detent 30 on the lever 25.

The crank axle 21 of the furrow wheel 18 has fixed thereto a sleeve 32, which is journaled upon the end of the extended portion 20 of the crank axle 19. A portion of the crank axle 21 extends above the portion 20 of the crank axle 19, as at 33, and a link 34 connects this portion 33 with a lever 36. This lever 36 is pivoted on a member 38, which has an arcuate tooth portion 39 and is connected at one end to one of the plow beams 11 by means of a link 40, and at the other end, by means of a link 42 clamped to the extended portion 20 of the crank axle 19. A detent 44 on the lever 36 engages the arcuate tooth portion 39 of the member 38.

Depth adjustment of the land wheel 17 with respect to the frame of the plow is effected by swinging of the lever 25, which may be engaged in any desired notch of the arcuate tooth portion 29 of the member 28. The sleeve portion 32 may be fixed against relative rotation with respect to the extended portion 20 of the crank axle 19 through the portion 33 of the crank axle 21, link 34, lever 36, and member 38. In other words, if the lever 36 is held in a particular position with respect to the arcuate tooth portion of the member 38 with the detent 44 engaging a particular tooth, then the sleeve 32 cannot turn about the extended portion 20 of the crank axle 19. Consequently, when there is an adjustment for depth of the land wheel 17 by means of the lever 25, a depth adjustment of the furrow wheel 18 also occurs, since the crank axle 21 is fixed with respect to the crank axle 19 through the sleeve 32.

A separate depth adjustment of the furrow wheel 18 is effected through the lever 36, the position of which may be varied with respect to the arcuate portion 39 of the member 38. A movement of the lever 36 transmits, through the link 34 and the portion 33 of the crank axle 21, a relative angular movement between the sleeve 32 of the axle 21 and the extended portion 20 of the crank axle. In this way there is an adjustment for depth of the furrow wheel 18. When it is desired to raise the plow shares 15 out of the ground, a pull on a cord 45 connected to the power lift 23 will cause the crank 27 to rotate so as to extend upwardly. Because of the connection of this crank 27 to the plow frame through the link 26 and lever 25, the upward movement of the crank 27 effects a raising of the plow frame.

It will be seen from the foregoing description that a novel plow construction has been provided by which there is a joint depth adjustment of land and furrow wheels and a separate depth adjustment of the furrow wheel. The crank axles supporting the wheels are arranged to swing about alined axes.

The intention is to limit the invention only within the scope of the appended claims.

What is claimed is:

1. In a plow construction, a plow frame, an axle having a crank portion at one end thereof, a land wheel attached to the crank portion, a furrow wheel, a crank arm journaled upon the other end of the axle and attached to the furrow wheel, means for adjusting the crank arm and furrow wheel with respect to the axle and land wheel, means for adjusting the land wheel and furrow wheel jointly, and power means for lifting the plow frame with respect to the land wheel and the furrow wheel.

2. A plow construction comprising a plow beam, a land wheel, a crank axle therefor having an extended portion journaled on the frame, an arm fixed to the extended portion, a furrow wheel, a crank axle therefor having a sleeve journaled on the extended portion of the other crank axle and having a portion extending beyond the sleeve away from the furrow wheel, a bent member having an arcuate portion and connected to the arm fixed to the extended portion of the first axle and to the plow through parallel links, and a lever pivoted on the bent member and fixable with respect to the bent member by means of a detent engaging the arcuate portion of the bent member, and a link connecting the lever and the said portion of the axle having the sleeve.

JAMES MORKOSKI.